March 16, 1926.
W. WESTBURY
1,577,007
METHOD OF AND MEANS FOR DRAWING GLASS CYLINDERS
Filed May 12, 1922
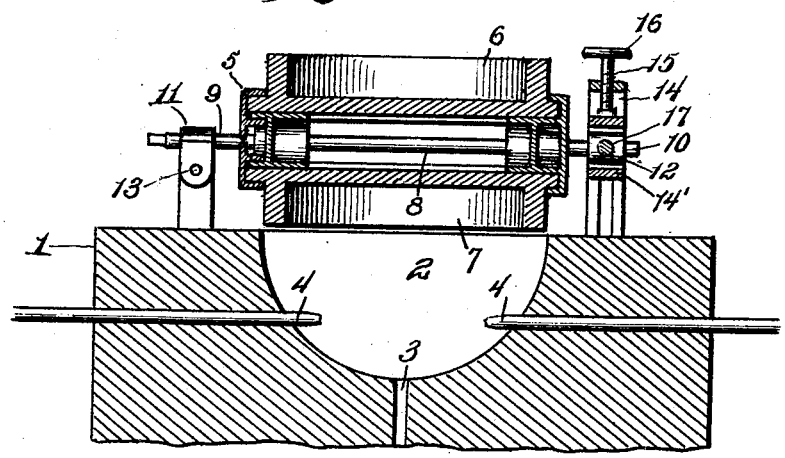
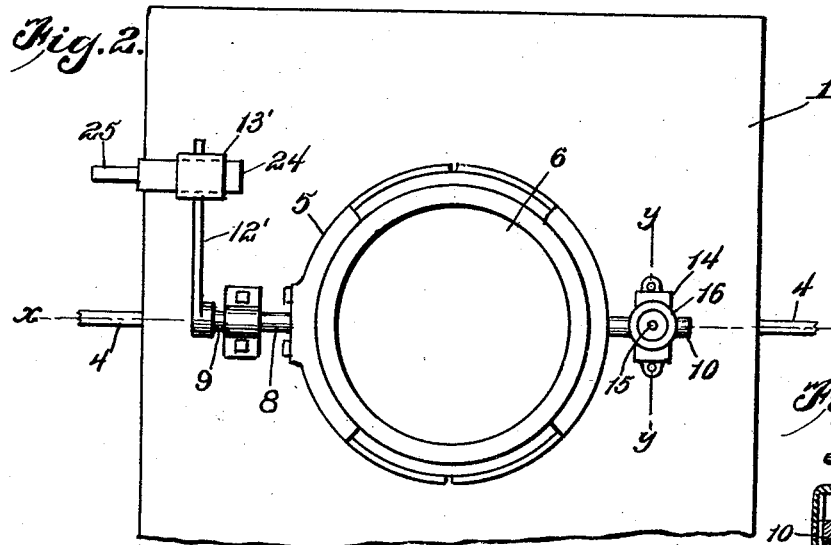
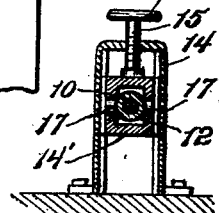
Inventor:
William Westbury,
By C. C. Hines,
Attorney Patented Mar. 16, 1926.

1,577,007

UNITED STATES PATENT OFFICE.

WILLIAM WESTBURY, OF INDEPENDENCE, KANSAS, ASSIGNOR, BY MESNE ASSIGNMENTS, TO HARDING GLASS COMPANY, OF FORT SMITH, ARKANSAS, A CORPORATION OF WEST VIRGINIA.

METHOD OF AND MEANS FOR DRAWING GLASS CYLINDERS.

Application filed May 12, 1922. Serial No. 560,434.

*To all whom it may concern:*

Be it known that I, WILLIAM WESTBURY, a citizen of the United States, residing at Independence, in the county of Montgomery and State of Kansas, have invented new and useful Improvements in Methods of and Means for Drawing Glass Cylinders, of which the following is a specification.

This invention relates to a method of and means for drawing cylinders in such a manner as to avoid the drawing of cylinders which are of uneven thickness at opposite sides, that is, of greater than the intended thickness at one side.

In drawing a cylinder from a charge of glass in a pot or similar receptacle of a greater given diameter than the diameter of the cylinder to be drawn, it is frequently the case that the cylinder is out of center with relation to the center of the pot. In such event two sides of the cylinder are disposed at different distances from the adjacent sides of the pot, the result being that one side of the cylinder is drawn from hot and limpid glass, while the opposite side of the cylinder is being drawn from cooler and more viscous glass, the thicker and more viscous glass producing an objectionably thick cylinder wall.

One object of my invention is to provide a method of drawing glass cylinders from a pot or similar receptacle, whereby, through a relative adjustment between the pot and cylinder, correction may be readily and conveniently made whenever the cylinder is found to be drawing "off center", to properly dispose the cylinder so that a cylinder having walls of substantially equal thickness may be drawn.

A further object of the invention is to provide a method of the character stated which admits of the described adjustment and correction in the drawing action being made at any time during the progress of the draw, or whenever the defect is discovered, thus preventing or reducing to a minimum the amount of thick wall surface drawn in any given cylinder.

A still further object of the invention is to provide a novel mode of mounting a body for tilting adjustments, whereby the described method may be carried into practical effect in a ready, convenient and simple manner.

A still further object of the invention is to provide a novel construction of heating kiln and a novel construction of pot for use in connection therewith, which pot may be reversed without the necessity of using a carriage shift, or a movable top stone, or of bodily raising the pot out of the kiln in order to enable it to be reversed.

In the accompanying drawing illustrating my invention,—

Figure 1 is a vertical section through a heating kiln and reversible pot embodying my invention and employed in my method, the section being taken on the plane indicated by the line *x—x* in Figure 2.

Figure 2 is a top plan view of the furnace and pot.

Figure 3 is a detail section on the line *y—y* of Figure 2.

In the present disclosure, I have shown one means of carrying my invention into practical effect, in which a double reversible pot is used, but it is to be understood that the invention is not limited thereto, as it will be obvious from the appended description that a single pot structure may be employed.

Referring to the drawing, 1 designates a melting kiln or furnace having a melting chamber 2 of approximately hemispherical form, which chamber is provided at its bottom with the usual eye or outlet 3 for the discharge of the melted glass refuse or aftermath from the pot. One or more gas or other suitable burners 4 are provided for heating the chamber 2 and bottom of the inverted pot from which the aftermath is to be melted in a well known manner.

Mounted upon the furnace structure is a pot carrying frame 5 carrying a pair of reversely disposed pots 6 and 7, having their bottom portions arranged in apposition, and their glass receiving chambers or cavities facing in diametrically opposite directions, the arrangement being such that when the pot 6 is in drawing position the pot 7 will be in draining position, and vice versa. The pot frame may be of any suitable construction and preferably provided with proper means for removably clamping the pots thereon, whereby when either pot is damaged it may be removed and a new pot conveniently substituted therefor.

Supporting means for tiltably mounting the pot frame is provided comprising a shaft 8 having end portions or journals 9 and 10 projecting at opposite sides of the pot structure, said journals being mounted respectively in bearings 11 and 12. The end 9 of the shaft has attached thereto an operating lever 12' provided with a counterweight 13', which counterweight substantially balances the weight of the pot structure and adapts it to be readily and conveniently tilted in one vertical plane on the shaft 8 as an axis of motion. The bearings 11 and 12 are specially mounted to enable the pot to be also tilted in another vertical plane at an angle to its plane of motion on the shaft 8, and as herein shown in a plane at right angles to its plane of motion on the shaft 8. To this end the bearing 11 is pivotally mounted, as at 13, to adapt the end 9 of the shaft 8 to tilt vertically on such pivotal connection, while the bearing 12 is vertically movable and adjustable in a guide-way formed in a guide member 14 to permit the end 10 of the shaft to be raised and lowered to effect a tilting adjustment of the shaft end 9 on the said pivotal connection 13. In the particular construction illustrated, the bearing 12 is carried by a vertically movable yoke 14' to which is swiveled the lower end of an adjusting screw 15 mounted in the guide member 14 and provided at its upper end with a hand wheel 16 by means of which it may be turned in one direction or the other to raise or lower the yoke 14' and, consequently, the bearing 12. By vertically adjusting the bearing 12 it will be evident that the pot may be tilted vertically along the line of the imaginary axis $y$—$y$ arranged at right angles to the axial line $x$—$x$ coincident with the plane of the shaft 8. In order to adapt the end 10 of the shaft 8 to accommodate itself to its angles of adjustment the bearing 12 is provided with trunnions 17 adapting it to turn upon the yoke 14' as will be readily understood.

In practice the mouth or open end of the chamber 2 is of slightly greater diameter than the diameter of the pots 6 and 7, and the shaft 8 is supported at such an elevation that the rim edge of the bottom or reversed pot, as shown by the pot 7 in Figure 1, lies close to and at a slight elevation above the level of the top of the chamber 2, the arrangement being such that when the pot structure is reversed to move one pot into and the other out of drawing position, in an arc of movement of 180°, the bottom of the pot structure will swing free and clear of the kiln and without interference therefrom. The bottom pot will thus be disposed in reversed or drainage position immediately above the chamber 2 and to a large extent close said chamber and lie immediately within the zone of the heat and flames from the burners 4, while at the same time the pot is so mounted that it may be reversed without any other than a simple 180° movement on its shaft or axis 8. By this means I obtain a reliable and efficient reversing action and disposal of the inverted pot member in proper drainage position, without the necessity of raising and lowering the pot for reversing actions as is required with many structures, or of using a carriage shift for moving the pot into and out of drainage position, or of employing a movable top stone and means for shifting the same into and out of operative position.

The pot and its frame structure as above described, which specifically forms the subject-matter of a copending application, Serial No. 560,435, filed May 12, 1922, is adapted for general uses in drawing glass cylinders, with the special advantages named over prior pot devices in common use, but it is further adapted to perform certain special functions in carrying out my improved method for correcting deficiencies in drawing actions and preventing the drawing of thick and thin cylinders. It is well known in the industry that the base of the cylinder being drawn will sometimes creep or travel upon the surface of the molten glass bath out of the normal or intended line of the draw, and that this leads to the production of thick and thin glass. My experiments have shown that no matter in what direction the displacement of the cylinder occurs, correction of the defective drawing action may be effected to secure a sufficiently true centering action for all purposes by tilting adjustment of the pot in two general directions only in planes at right angles to each other.

Assuming that the axis 8 is disposed for a tilting motion of the pot in two cardinal directions, to wit, east and west, it will be understood that similar corrective movements for centering actions may be obtained by tilting the pot through movements on the pivot 13 for north and south cardinal point adjustments, or in two different directions at right angles to the plane of the corrective movements east and west. These four tilting adjustments for which the pot is adapted as disclosed in the present instance, will in general be found all that is necessary to correct defective draws of the character specified, irrespective of the direction in which the cylinder is displaced or off center with relation to the axial center of the pot and the charge of glass therein. Any of these corrective movements may be performed at any time during the progress of a draw, when the cylinder is discovered to be off center, without stopping the progress of the draw, or discarding the portion of the cylinder already drawn or waiting for correction until the defective cylinder is fully drawn and the drawing of another cylinder is begun, as is required under present practices. By the use of my method, and the described means for carrying it into practical effect, defective draws, in point of thick and thin cylinders, may be prevented or reduced to the minimum, and material losses ordinarily occurring through waste avoided.

It will be observed that no means auxiliary to the adjusting screw 15 is required for holding the pot titlted in either direction of the line $y$—$y$. For the purpose of holding the pot structure in adjusted position when tilted in the direction of line $x$—$x$, any suitable means may be employed. I have shown in the present instance a simple form of adjusting and holding device comprising a wedge 24 having a carrying and manipulating handle 25. When the lever 12′ is swung over in either direction to an approximate position of adjustment, the wedge may be inserted between the same (or the counterweight 13′ thereon) and the top of the kiln 1 and adjusted in and out as occasion may require to dispose the pot structure at the exact and desired level. By shifting the wedge 24 in and out an exceedingly accurate degree of adjustment may be obtained and an easy and convenient centering action secured without the expenditure of any great amount of time or effort on the part of the operator. As the wedge 24 may be interchangeably employed on either side of the center line $x$—$x$ for co-operation with the lever 12′, it will be evident that maximum simplicity is secured and the use of complex or otherwise objectionable fastening and adjusting means avoided.

It will, of course, be understood that while I have shown a double reversible pot, which, for convenience and general efficiency will be preferably used, the same mode of operation for carrying my method into practice may be employed with a single pot structure, and hence I do not limit my invention in this connection.

Having thus fully described my invention, I claim:—

1. In a glass drawing apparatus, a glass drawing pot, a rotary support for the pot extending on a line diametrically of the pot in one direction and on which the pot is adapted to be tilted in a direction at right angles to such diametrical line, said support being fulcrumed at one end, and means operative upon the opposite end of the support for swinging said support on its fulcrum and tilting the pot in a plane coinciding with the said diametrical line and at right angles to the direction of tilting motion first mentioned.

2. In a glass drawing apparatus, the combination of a drawing pot, a shaft carrying said pot and having oppositely extending end portions, a vertically tilting bearing in which one end of the shaft is journaled, a bearing in which the other end of the shaft is journaled, a yoke in which the second-named bearing is mounted to tilt vertically, a guide in which the yoke is mounted for vertical adjustment, and means for vertically adjusting the yoke in said guide.

3. In a glass drawing apparatus, the combination of a melting kiln, a shaft disposed above the top of the kiln, a pot carried by said shaft, a lever movable in opposite directions for swinging said pot between drawing and draining positions, and a wedge adapted to be inserted between the lever and the top of the kiln to tiltably adjust the pot so as to effect a relative shifting of the centers of a glass charge therein and a cylinder being drawn therefrom.

4. In the art of drawing glass cylinders from a charge of glass in a pot, the method of correcting defective draws due to the lateral displacement of the cylinder from the normal drawing zone, which consists in tilting the pot, while drawing, on either one or both of two axes one lying in a plane diametrical of the pot and the other in a plane at right angle thereto.

In testimony whereof I affix my signature.

WILLIAM WESTBURY.